Patented Feb. 19, 1935

1,991,465

UNITED STATES PATENT OFFICE 1,991,465

REFRIGERATION PROCESS

Ernest B. Miller and Gerald C. Connolly, Baltimore, Md., assignors, by mesne assignments, to Chester F. Hockley, receiver for The Silica Gel Corporation, Baltimore, Md., a corporation of Maryland No Drawing. Application June 9, 1931, Serial No. 543,240

10 Claims. (Cl. 62—179)

The present invention which is a continuation in part of our applications, Serial No. 427,649, filed February 11, 1930; Serial No. 470,227, filed July 23, 1930; and Serial No. 500,666, filed December 6, 1930; relates to refrigeration and more particularly to the type wherein the cooling effect is obtained by the evaporation of a liquid, and the vapor is taken up in a solid porous adsorbent.

Refrigeration systems of this type may comprise an evaporator or cooling chamber, containing the liquid to be evaporated or fluid evaporated by expansion through an orifice, an adsorber containing the adsorbing material, and a condenser for condensing the vapor driven off from the adsorbing material and returning it to said evaporator or cooling chamber. Where solid adsorbent material is employed for taking up the vapor from the cooling chamber, the adsorption must be effected in the substantially total absence of permanent gases, or the rate of adsorption will be so reduced that an effective cooling will not be secured. One form of apparatus suitable for the present invention is shown in Figure 2 of United States Patent 1,729,081, granted September 24, 1929.

Various liquids may be employed in systems of this type, for instance, sulphur dioxide, water, ammonia, butane, methyl chloride, and amines such as methylamine, ethylamine, dimethylamine, tri-methylamine, etc. Likewise, various adsorbents may be used, for example, hard, porous gels such as the gels of silica, tungsten oxide, aluminum oxide, etc., and gels consisting of two or more of these oxides, activated charcoal, etc. However, not all of the adsorbents can be employed with any one liquid, and, vice versa, not all of the liquids can be employed with any one adsorbent. Many of the combinations of adsorbent and liquid will operate at first, but after repeated cycles either there is a breaking down of the vapor, gradually forming permanent gases, or else there is a reaction between the vapor and adsorbent that reduces the adsorptive power of the adsorbing material.

Tests have shown that the combination of silica gel as the adsorbent and ammonia or an amine as the liquid, after repeated activations, is not so satisfactory as the combination of silica gel and sulphur dioxide, or silica gel and water. It is thought that with the ammonia or amine-silica gel system, action on the gel injures it, and perhaps permanent gases are formed.

The principal feature of the present invention is the provision of an adsorption refrigeration system that operates successfully with a solid, porous adsorbent and ammonia or an amine.

According to the present invention it has been found that no harmful effects occur if the adsorbent has its moisture content reduced to such point that no reaction injurious to the adsorbent occurs when in use in the system.

The solid, porous adsorbent may be a plain dried gel containing only one hydrous oxide such as the oxide of iron, chromium, bismuth, aluminum, gallium, copper, nickel, beryllium, titanium, indium, zirconium, thorium, cerium, scandium, vanadium, manganese, silicon, germanium, tin, tantalum, molybdenum, tungsten, or the like, or mixtures of any of said oxides, treated as by activation to reduce the water content to such point that no reaction injurious thereto occurs when used to adsorb dry ammonia or amine in the refrigerating cycle previously described.

The hydrous oxide gels, such as those of the oxides of silicon, titanium, germanium, tin, tantalum, molybdenum, tungsten, and pentavalent vanadium, are best prepared by reacting the ingredients capable of forming the desired hydrous gel under such conditions as to form an intermediate reaction product which is acid and treating such reaction product so as to convert it into the dried gel.

The hydrous oxide gels, such as those of the oxides of iron, chromium, aluminum, gallium, indium, copper, nickel, beryllium, titanium, zirconium, thorium, cerium, scandium, manganese, and tetravalent vanadium, are best made by reacting the ingredients capable of forming the desired hydrous oxide gel under conforming ditions such as to form an intermediate reaction product which is alkaline, and treating such reaction product so as to convert it into the dried gel.

Where it is desired to use a plain gel obtained from an intermediate reaction product which is acid, like silica, tungstia, stannia, titania gels, etc., or mixed gels of said oxides, the moisture content should be below 5%, preferably about 3% to 4% of its dry weight. If the plain gel to be employed is one obtained from an intermediate reaction product which is alkaline, as for instance, aluminum, chromium, vanadium, iron oxide gels, etc., or mixtures of said oxides, the moisture content may be as high as 10% of its dry weight.

In place of a dried gel containing one or more hydrous oxides, a material having a pore structure similar to a dried gel such as base exchange compounds, activated carbon, treated as by activation to reduce the moisture content to such point that no reaction injurious thereto occurs when used to adsorb dry ammonia or amine in the refrigerating cycle, may be employed. If desired, a dried gel containing one or more hydrous oxides admixed with activated carbon, a gel having a filler of the adsorbent type such as Bentonite associated therewith, or non-homogeneous gels containing one or more hydrous oxides, may also be used. The base exchange compounds may be the natural occurring compounds such as glauconite, suitable natural zeolites and the like, or the artificially prepared compounds, for instance, sodium chromium silicate, potassium boron silicate, sodium vanadium silicate, and the like, or the porous structure remaining after leaching the base exchange compound with either acid or water. Of the base exchange compounds, the artificially prepared compounds derived via a hydrogel or gelatinous precipitate are preferably used. The moisture content of the base exchange compounds, activated carbon, and the other aforementioned materials should be reduced to a point below 10% of their dry weight.

In order to reduce the water content of the gel, base exchange compound, or like material, to this low amount, it is heated to temperatures between 375° and 450° C. for 2 or 3 hours, although in the refrigerating cycle the activating temperature of the adsorbent rarely exceeds 233° C.

Where it is desired to use an amine as the refrigerant, methylamine is preferably employed.

As a specific example of the adsorbent material which may be used in the process of the present invention, reference may be had to silica gel. This may be prepared in any suitable manner, for instance, in accordance with the instructions given in the Patrick Patent 1,297,724, as by adding, with agitation, a solution of sodium silicate to an equal volume of an acid solution, such as a 10% solution by weight of hydrochloric acid, the specific gravity of the silicate solution being about 1.185. The ratio of $SiO_2$ to $Na_2O$, in the silicate solution may be as in any commercial solution, about 3.25 to 1. After a time the reaction mixture or sol, as it is called, sets to a homogeneous jelly-like mass termed a "hydrogel". This is broken into pieces and washed with water, preferably at 105° to 175° F., to remove salt and acid. The hydrogel is then dried in a current of air at 200° C. Before charging the refrigerating apparatus with the silica gel it is activated at 375° to 450° C. to reduce the moisture to a low point, say not more than 5%, preferably 3 to 4% of the dry product by weight.

With the low moisture content, there is no, or insufficient, reaction to injure the gel.

Another specific adsorbent material which may be used in the process of the present invention with satisfactory results is alumina gel. This may be prepared by mixing equal volumes of a solution of aluminum sulphate of about 5 to 10% strength and a normal alkali solution such as sodium hydroxide or ammonium hydroxide at 0° C. or lower. Care should be taken that the reaction mass is alkaline. The jelly or gelatinous precipitate that forms is washed by decantation to free it of excess alkali and ammonium or sodium sulphate, depending upon the particular alkali employed in the formation of the precipitate.

If desired, the washed gelatinous precipitate may be peptized as by treating same with a suitable peptizing agent to thereby form a jelly-like reaction mass which in final form exhibits superior adsorptive properties.

The jelly is then dried in a current of air at 125° C. Before charging the refrigerating apparatus with the alumina gel it is activated at 375° to 400° C. to reduce the moisture content to a low point, say not more than 10% of the dry product by weight.

It has been found that alumina-silica gel is not injured by ammonia or an amine when this combination is employed in the adsorption refrigeration cycle, evidently because the water present has a greater affinity for the alumina than the ammonia or amine, so that no injurious reaction occurs. The alumina-silica gel may be prepared in any suitable manner, for example, by thoroughly intermixing washed alumina hydrogel with washed silica hydrogel, such mixture then being squeezed through an extruding machine and the product dehydrated or dried in the usual manner so that the end product or mixed gel is a hard, porous adsorbent. Usually alumina gel is a poorer adsorbent than silica gel, and for this reason it is preferred that the alumina shall not be present in an amount greater than about 10% or so of the weight of the silica.

As an example of a method of making an alumina-silica gel the following may be given. A washed silica hydrogel prepared in the manner above described or in any other suitable manner, and an alumina jelly is prepared as previously described. The silica hydrogel and alumina jelly are then thoroughly intermixed in the proportions of not more than 1 part of alumina jelly to 10 parts of silica hydrogel by weight. This mixture is then extruded through an orifice and dehydrated or dried by heating in a current of air at 125° C., which, after some time, may be increased to 400° C. Before installation in the refrigerating apparatus, this plural gel preferably is activated at 375° to 450° C. for about 3 hours to reduce the moisture content to a point not much greater than about 5% by weight of the dry product, although with this silica-alumina gel the refrigeration cycle will operate successfully for long periods with a higher moisture content in the gel.

In the above example other metal oxide gels, as chromium oxide gel, may be substituted for the alumina gel.

The term "evaporating" as used herein is intended to apply to any means for causing vapor to form from a liquid, whether by heat, or expansion through an orifice, or otherwise.

In the claims, the term "amo" is used to designate both ammonia and an amine.

Having thus described the invention, what is claimed as new and desired to be secured by Letters Patent is:

1. A method of refrigeration consisting in evaporating liquid amo and adsorbing the gaseous amo, in a solid, porous adsorbent material having the moisture content reduced to a point not exceeding 5% of its dry weight.

2. The method according to claim 1 wherein the adsorbent is a material having a pore structure similar to a gel.

3. The method according to claim 1 wherein the adsorbent material is a hard, porous gel.

4. The method according to claim 1 wherein the adsorbent material comprises silica gel.

5. A method of refrigeration consisting in evaporating liquid amo and adsorbing the gaseous amo, in a highly porous dried gel prepared under acidic conditions, the moisture content of the dried gel being below 5% of its dry weight.

6. The method according to claim 5 wherein the gel is silica gel.

7. A method of refrigeration consisting in evaporating liquid amo and adsorbing the gaseous amo, in a highly porous dried gel prepared under alkaline conditions.

8. The method of refrigeration consisting in activating silica gel at a temperature between 375° and 450° C., charging the same into refrigeration apparatus containing an anhydrous liquid amo, evaporating the liquid and adsorbing the gaseous amo in the silica gel and thereafter activating the gel at a lower temperature to remove the amo for further evaporation.

9. The method of refrigeration consisting in evaporating liquid amo and adsorbing the gaseous amo in silica gel originally activated to a temperature between 375° C. and 450° C.

10. The method according to claim 9 with the step, after the adsorption, of activating the silica gel at a lower temperature to remove the amo for condensation and re-adsorption.

ERNEST B. MILLER.
GERALD C. CONNOLLY.